United States Patent [19]
Secrist

[11] 3,724,496
[45] Apr. 3, 1973

[54] CAGE AND GUIDE CONSTRUCTION FOR A BALL-TYPE VALVE

[75] Inventor: Walter S. Secrist, Dallas, Tex.

[73] Assignee: United States Steel Corporation

[22] Filed: Nov. 11, 1971

[21] Appl. No.: 197,685

[52] U.S. Cl. ............................................137/533.13
[51] Int. Cl. ...............................................F16k 15/04
[58] Field of Search.......137/533.11, 533.13, 533.19, 137/539, 543.19; 417/554

[56] References Cited

UNITED STATES PATENTS 2,591,174    4/1952    Martin.............................137/533.13
2,682,281    6/1954    Ecker..............................137/533.13
3,059,667    10/1962   Coleano..........................137/533.13

*Primary Examiner*—Robert G. Nilson
*Attorney*—Walter P. Wood

[57] ABSTRACT

A cage and guide construction for a ball-type valve, used for example in a subsurface pump. The cage has spaced apart internal shoulders which have confronting grooves. The guide pieces lie between the shoulders and have lips received in the grooves to lock them in place. The guide pieces can be either metal or elastomer and are not distorted when inserted or removed.

4 Claims, 4 Drawing Figures

PATENTED APR 3 1973 3,724,496

CAGE AND GUIDE CONSTRUCTION FOR A BALL-TYPE VALVE

This invention relates to an improved cage and guide construction for a ball-type valve, used for example in a subsurface pump.

A conventional ball-type valve includes an annular seat, a ball cooperable with the seat for stopping flow of fluid through the valve in one direction, and a cage for confining the ball when it is unseated. The cage may be either of the closed-sided type, from which fluid discharges at the end, or of the open-sided type, from which fluid discharges through slots in the sides. When fluid is pumped under high pressures and at high velocities, there is need for the ball to be guided as it moves within the cage to prevent it from oscillating and causing excessive wear. Guides used in cages may be formed either of hard metal or of elastomer pieces fixed within the cage. Reference can be made to Yerkes et al. U.S. Pat. No. 1,901,217 or Hammett U.S. Pat. No. 2,085,360 for showings of metal guides used heretofore, and to Martin U.S. Pat. No. 2,591,174, Ecker U.S. Pat. No. 2,682,281, or Harris et al. U.S. Pat. No. 2,937,659 for showings of elastomer guides.

Metal guides are preferred for severe operating conditions, as in pumps used in deep wells or at high temperatures, but elastomer guides have longer life under less severe conditions. Cages of most designs can accommodate only one type of guide, metal or elastomer. With elastomer guides in particular, there has been a problem in assembling the guides in the cage and in locking them in place. Unless pins or clips are used as locking means, it has been necessary to distort the guide pieces to insert or remove them.

An object of my invention is to provide an improved cage and guide construction which overcomes the foregoing problems, that is, in which the cage can accommodate either metal or elastomer guide pieces interchangeably, the guide pieces can be inserted or removed without distorting them, and no additional locking means are needed.

A further object is to provide an improved cage and guide construction which affords the foregoing advantages and can be applied to a cage of either the closed-sided or open-sided type.

Figure 1:
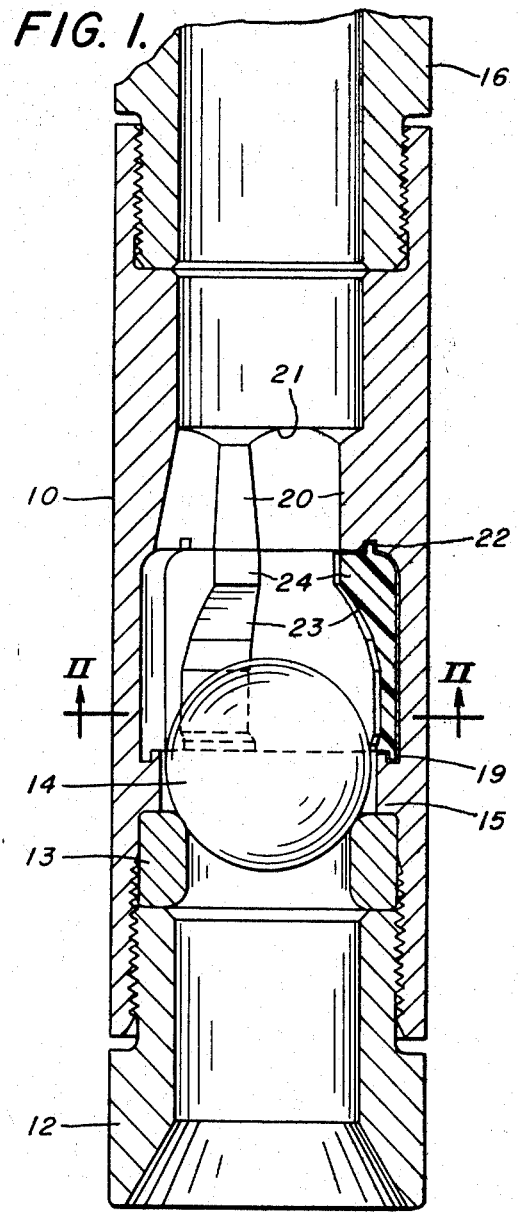
FIG. 1 is a longitudinal sectional view of a ball-type valve which embodies a closed-sided cage and guide construction in accordance with my invention.
Figure 2:
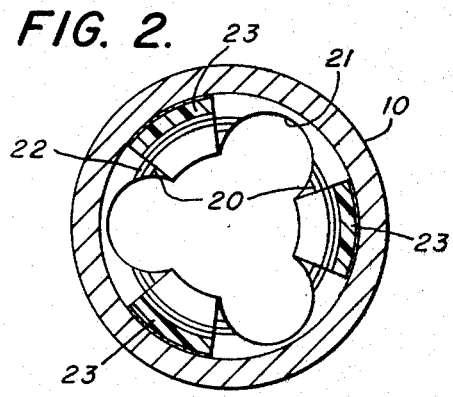
FIG. 2 is a cross-section on line II—II of FIG. 1.

The valve shown in FIGS. 1 and 2 comprises a closed-sided cage 10, a plug 12 threadedly engaged with the lower end of the cage, an annular seat 13 fixed within the cage, and a freely movable ball 14 confined within the cage and cooperable with the seat for preventing downward flow of fluid through the valve. The cage has a continuous internal shoulder 15. The seat 13 is fixed between the upper face of plug 12 and the underface of shoulder 15. The valve illustrated is a traveling valve of a subsurface pump, and in this instance the cage is threadedly connected to the lower end of a tubular plunger rod 16. The upper end of the cage is open to afford communication with the bore of rod 16 and permit discharge of fluid. Nevertheless similarly constructed valves may be used as check valves in many applications.

In accordance with my invention, the upper face of shoulder 15 has a continuous circular groove 19 around its edge adjacent the cage wall. The cage has a plurality (two or more) of circumferentially spaced segmental internal shoulders 20 (illustrated as three in number) spaced above the continuous shoulder 15. The circumferential spaces between shoulders 20 are indicated at 21. The underfaces of shoulders 20 have arcuate grooves 22 confronting the circular groove 19. A plurality of guide pieces 23, which may be either metal or elastomer, lie between shoulders 15 and 20. The guide pieces correspond in number to shoulders 20, and have arcuate lips which protrude from their bottom and top faces and are received in grooves 19 and 22 respectively. The guide pieces have overhanging portions 24 which serve to confine the ball 14.

In assembling the structure, I insert the guide pieces 23 through the open upper end of cage 10 in the spaces 21 between shoulders 20. The bottom lips of the guide pieces enter groove 19, while the top lips are circumferentially aligned with grooves 22. I next rotate each guide piece through the arc necessary for its top lip to lie fully within a groove 22, in this instance about 60°. I fix the guide pieces in place by applying any suitable adhesive, which I may apply to the backs of the guide pieces or merely place in grooves 19 or 22 next to the guide pieces. Alternatively I may peen the material beside grooves 22 next to the guide pieces or weld small beads therein.

Figure 3:
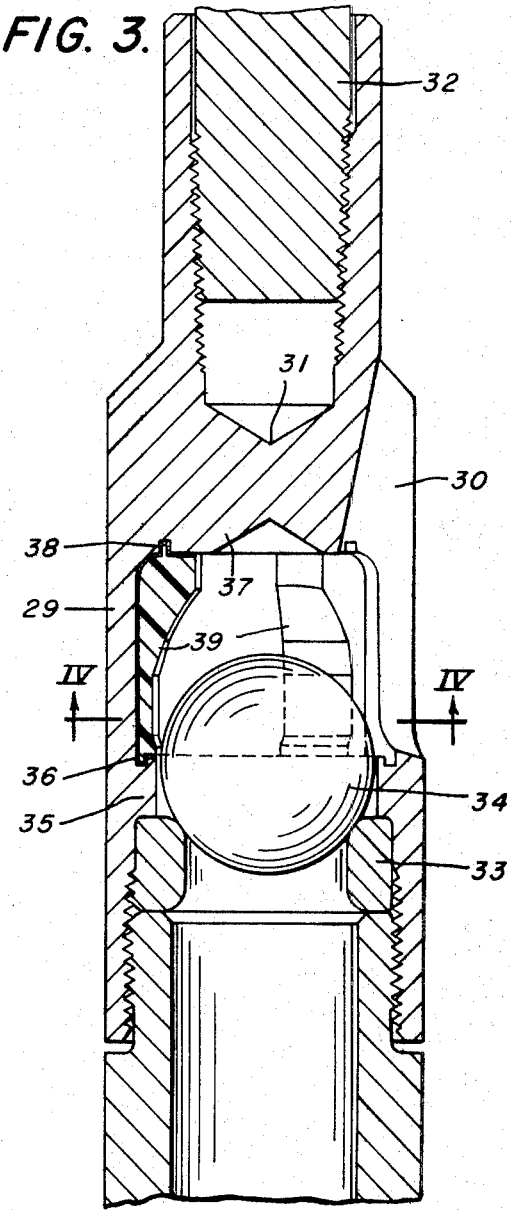
FIG. 3 is a longitudinal sectional view of a modification in which the cage is open-sided.
Figure 4:
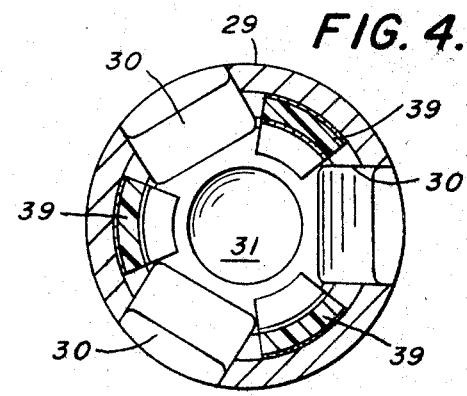
FIG. 4 is a cross section on line IV—IV of FIG. 3.

In the modification shown in FIGS. 3 and 4, the cage 29 has a plurality of slots 30 (illustrated as three in number) in its side walls, through which fluid discharges to the space around the valve. The upper end of the cage has a wall 31 and is connected to a solid plunger rod 32. The valve comprises a seat 33 and ball 34, and the cage has a continuous internal shoulder 35 similar to the valve shown in FIGS. 1 and 2. Also the upper face of shoulder 35 has a similar continuous circular groove 36. Slots 30 divide the outer edge of wall 31 into a corresponding number of circumferentially spaced segmental shoulders 37. The underfaces of shoulders 37 have arcuate grooves 38. A plurality of guide pieces 39, which can be identical to the guide pieces 23 of FIGS. 1 and 2, lie between shoulders 35 and 37 with their bottom and top lips received in grooves 36 and 38 respectively. I assemble the structure in the same manner as the structure shown in FIG. 1, except that I insert the guide pieces 39 through the slots 30 in the side walls of cage 29.

From the foregoing description it is seen that my invention affords a simple cage and guide construction. In both embodiments illustrated, the guide pieces can be of rigid metal or of a resilient elastomer. The guide pieces are locked in place in the cage by engagement of their bottom and top lips within grooves in the cage, thus dispensing with the need for pins or clips. It is not necessary to distort the guide pieces in any way to insert or remove them.

I claim:

1. In a valve, which comprises a cage, a seat fixed within said cage, a ball confined within said cage and cooperable with said seat for preventing flow of fluid in one direction through the valve, and guide means in said cage for said ball, an improved cage and guide construction comprising an internal shoulder within said cage, a plurality of circumferentially spaced segmental internal shoulders within said cage spaced from said first-named shoulder, said first-named shoulder having a circular groove, said second-named shoulders having arcuate grooves confronting said circular groove, and a plurality of guide pieces lying between said first and said second-named shoulders, each of said guide pieces having lips at its opposite ends received respectively in said circular groove and in one of said arcuate grooves to lock the guide pieces within said cage, said cage having at least one opening through which said guide pieces can be inserted into the spaces between said second-named shoulders and rotated to lock them in the cage.

2. A valve as defined in claim 1 in which the opening in said cage is in one end.

3. A valve as defined in claim 1 in which there are a plurality of openings in the form of slots in the sides of the cage.

4. A valve as defined in claim 1 in which the guides pieces are inserted and removed through said opening without distorting them and may be either rigid metal or resilient elastomer.

* * * * *